(12) United States Patent
Di et al.

(10) Patent No.: US 10,809,412 B2
(45) Date of Patent: Oct. 20, 2020

(54) WEM-BASED METHOD FOR DEEP RESOURCE DETECTION USING SKY WAVES

(71) Applicant: Institute of Geology and Geophysics, Chinese Academy of Sciences, Beijing (CN)

(72) Inventors: Qingyun Di, Beijing (CN); Guoqiang Xue, Beijing (CN); Ruo Wang, Beijing (CN); Zhiguo An, Beijing (CN); Changmin Fu, Beijing (CN); Da Lei, Beijing (CN); Xianjun Zhuo, Beijing (CN); Zhongxing Wang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 384 days.

(21) Appl. No.: 15/851,754

(22) Filed: Dec. 22, 2017

(65) Prior Publication Data
US 2019/0196046 A1    Jun. 27, 2019

(51) Int. Cl.
*G01V 3/12* (2006.01)
*G01V 3/38* (2006.01)

(52) U.S. Cl.
CPC . *G01V 3/12* (2013.01); *G01V 3/38* (2013.01)

(58) Field of Classification Search
CPC ..... A61B 5/0476; E21B 47/122; G08C 17/02; H01Q 1/366; H02J 50/12; G01V 3/15;
(Continued)

(56) References Cited

U.S. PATENT DOCUMENTS 3,745,575 A * 7/1973 Kikuchi .................. G01V 3/12
  342/22
3,967,201 A * 6/1976 Rorden ................. E21B 47/122
  340/854.5
(Continued)

OTHER PUBLICATIONS

China's Super-Secret Project WEM, Google Mar. 2020.*
(Continued)

*Primary Examiner* — Kandasamy Thangavelu
(74) *Attorney, Agent, or Firm* — Bayramoglu Law Offices LLC

(57) ABSTRACT

A WEM-based method for deep resource detection using sky waves refers to the technical field of deep resource detection. The proposed method of deep detection using sky waves improves the traditional "atmospheric-lithosphere" half-space propagation theory into a full-space "sky wave" theory of "ionosphere-atmosphere-rock layer", that is, the influence of the ionosphere and the displacement current in the air are taken into consideration to obtain a new precise expression of "sky wave" response, which is suitable for full space, slow attenuation and long distance propagation. A receiving device for sky wave signal has been developed. Through theoretical model calculation and actual data measurement, it is known that it is possible to use the sky wave for detection within the scope of China's national territory to realize the high-precision electrical structural exploration within a depth of 10 kilometers and open a new era of artificial source electromagnetic detection.

5 Claims, 9 Drawing Sheets

(58) Field of Classification Search
CPC ....... G01V 3/12; G06Q 30/0201; H04W 4/02; G01S 3/10
See application file for complete search history.

(56) References Cited

U.S. PATENT DOCUMENTS

| | | | | |
|---|---|---|---|---|
| 4,125,804 | A * | 11/1978 | Schroeder | G01S 13/10 324/329 |
| 8,264,226 | B1 * | 9/2012 | Olsson | G01V 3/15 324/329 |
| 2004/0193068 | A1 * | 9/2004 | Burton | A61B 5/0476 600/544 |
| 2005/0057432 | A1 * | 3/2005 | Anderson | H01Q 1/366 343/909 |
| 2015/0069831 | A1 * | 3/2015 | Kesler | H02J 50/12 307/9.1 |
| 2015/0097567 | A1 * | 4/2015 | Berg | G01V 3/12 324/326 |
| 2016/0189174 | A1 * | 6/2016 | Heath | G06Q 30/0201 705/7.29 |
| 2017/0062951 | A1 * | 3/2017 | Takei | G08C 17/02 |
| 2018/0252835 | A1 * | 9/2018 | Deng | H04W 4/02 |
| 2019/0356174 | A1 * | 11/2019 | Shen | H02J 50/27 |

OTHER PUBLICATIONS

China's NYC-Sized Earthquake Warning System to Talk to Submarines, Google Mar. 2020.*
Controlled source audio magnetotellurics, Google Mar. 2020.*
Controlled-source Audio-frequency Magnetotellurics (CSAMT), Google Mar. 2020.*
Correlative light and electron microscopy, Google Mar. 2020.*
Correlative light-electron microscopy, Google Mar. 2020.*
What is a sky wave, Google Mar. 2020.*

* cited by examiner

WEM-BASED METHOD FOR DEEP RESOURCE DETECTION USING SKY WAVES

TECHNICAL FIELD

The present invention belongs to the technical field of deep resource detection and specifically relates to a Wireless Electromagnetic (WEM) for deep resource detection using sky waves.

BACKGROUND OF THE INVENTION

Sky waves refer to electromagnetic waves that are generated by hundreds of ampere-coded currents injected into the ground by a hundred kilometers of ground wire and then transmitted upward to the ionosphere and then reflected by the ionosphere to the ground. In the past, it was mainly used in the field of radio communications and navigation. Although scientists from the United States and Russia have proposed their research ideas for detecting the structure of ore-bearing areas using sky waves, how to use "sky wave" for actual detection of mineral resources is still rarely reported in the world at present. Due to the lack of shallow mines at present, deep resources have become the main body for the development of underground resources in the future. The conventional artificial source electromagnetic method has the problems of small signal coverage, shallow detection depth, and heavy equipment.

The sustainable development of our society and economy is facing the severe pressure of scarce resources. With the intensification of mineral development, shallow mineral resources have been substantially reduced. The potential to exploit many mines is seriously inadequate. The degree of protection for the industrialization of the exploration petrochemical energy and solid mineral resources is declining. It is of great importance to strengthen detection of mineral resources in the deep areas.

Although the artificial source electromagnetic method has played an important role in geological mapping, coalfield, geothermal, groundwater and metal mineral resource exploration and engineering investigation, under normal circumstances, the length of the conventional artificial current source is 1-2 km, the launch frequency is 0.1-300 Hz, transmitter power is 30 KW, the detection range is within 5-10 km, the detection depth is 1 km, which can not meet the requirements of the fine deep detection. Therefore, the launch power needs to be greatly increased in order to achieve deep detection. Due to the complicated terrain in China, the transmitter is too bulky to take it up the mountain and the operation is inconvenient. There is an urgent need to develop means of underground resource detection with the characteristics of excellent penetration ability, good adaptability, cost-efficiency, and convenience. Is it possible to use another method for resource detection? People turn their attention to extremely low frequency electromagnetic waves.

The main purpose of extremely low frequency (refers to 0.1~300 Hz, including the provisions of China's radio frequency division to the extra low frequency, extremely low frequency, ultra-low frequency, collectively referred to as extremely low frequency) electromagnetic technology is to solve the problem of communication between land command centers and deep-water submarines. To this end, the United States and the former Soviet Union brought together many outstanding radio physicists and geophysicists to conduct in-depth studies on the emission and propagation of extremely low frequency electromagnetic waves and other related issues. Basic theory matured by late 1970s.

In the 1980s, the United States established extremely low frequency launch pads in Northern Wisconsin (antenna length is 22.5 km) and Michigan (antenna length is 45 km), respectively. The former Soviet Union also established a high-power extremely low frequency launch pad in the Kola Peninsula (antenna length is 60 km), successfully implementing communications between land command centers and deep-water submarines.

In the 1990s, a large number of extremely low frequency electromagnetic detection exploratory tests were first conducted by Russian scientists using extremely low frequency platform (ZEVS) of the Kora Peninsula and rented power lines as transmitting antennas.

American scientists put forward to apply very low frequency to deep underground detection, geomagnetic energy band research and magnetosphere and ionosphere research. Russian scientists proposed to apply extremely low frequency to earthquake prediction, detailed stratigraphic section surveys, the detection of crustal electrical structures, the detection of ore-bearing area structures, the exploration and prediction of oil and gas generating areas including the continental shelf, geological and ecological research, nuclear power plants, the exploration of large reservoirs and other places. However, till now, there is still no achievement in technical exploration and formal implementation of resource detection.

SUMMARY OF THE INVENTION

In order to solve the above problems in the prior art, a WEM-based method for deep resource detection using sky waves is proposed in the present invention.

Specifically, the WEM-based method for deep resource detection using sky waves provided by the present invention is as follows. An electromagnetic wave is obtained from a signal source using a WEM method. The electromagnetic wave propagates upward to form a sky wave, which propagates to the ionosphere and is reflected to the underground ore-body by the ionosphere, and finally propagates from the underground ore-body to the ground.

A mathematical model of the sky wave propagation is established. The electromagnetic wave signal propagated from the underground ore-body to the ground is collected and processed according to the slow attenuation characteristics of sky waves and the plane distribution of sky waves.

Further, the sky wave mathematical model established in the method is Formula (1) to (5):

$$H_r = -\frac{Idl\sin\varphi}{2\pi r} \left[ \int_0^\infty \frac{m}{m+n_1/R^*} J_1(mr)dm + r\int_0^\infty \frac{n_1}{R^*} \frac{m}{m+n_1/R^*} J_0(mr)dm \right] \quad (1)$$

$$H_\varphi = \frac{Idl}{2\pi r}\cos\varphi \int_0^\infty \frac{n_1}{R^*} \frac{m}{m+n_1/R^*} J_1(mr)dm \quad (2)$$

$$H_z = \frac{Idl}{2\pi}\sin\varphi \int_0^\infty \frac{m^2}{m+n_1/R^*} J_1(mr)dm \quad (3)$$

$$E_r = \frac{Idl}{2\pi}\cos\varphi \left[ \frac{i\omega\mu}{r}\int_0^\infty \frac{J_1(mr)dm}{m+n_1/R^*} - \rho_1\int_0^\infty \frac{n_1 m}{R} J_0(mr)dm + \frac{\rho_1}{r}\int_0^\infty \frac{n_1}{R} J_1(mr)dm \right] \quad (4)$$

-continued $$E_\varphi = \frac{Idl}{2\pi}\sin\varphi\left[-i\omega\mu\int_0^\infty \frac{mJ_0(mr)dm}{m+n_1/R^*} + \frac{\rho_1}{r}\int_0^\infty \frac{n_1}{R}J_1(mr)dm + \frac{i\omega\mu}{r}\int_0^\infty \frac{J_1(mr)}{m+n_1/R^*}dm\right] \quad (5)$$

Where, $R^* = \coth\left[n_1h_1 + \coth^{-1}\frac{n_1}{n_2}\coth\left(n_2h_2 + \ldots + \coth^{-1}\frac{n_{N-1}}{n_N}\right)\right]$, $R = \coth\left[n_1h_1 + \coth^{-1}\frac{n_1}{n_2}\frac{\rho_1}{\rho_2}\coth\left(n_2h_2 + \ldots + \coth^{-1}\frac{n_{N-1}}{n_N}\frac{\rho_{N-1}}{\rho_N}\right)\right]$, where I is the transmit current, R is the distance between the transmitting source and the receiver, dl is the length of the dipole, φ is the angle between the transmitting source and the receiver, r is the radius in the X-axis, μ is the permeability, and ω is the angular frequency, $n_i^2 = m^2 - k_i^2$, $k_i = \sqrt{i\omega\mu\sigma_i}$, $J_0$ and $J_1$ are the zeroth order and the first order of the Bessel function, respectively, $h_p = z_p - z_{p-1}$ is the thickness of the pth layer, $\rho_p$ is the resistivity of the pth layer, and coth is the hyperbolic coherent equation.

Further, the collecting station of the method for collecting the electromagnetic wave signals propagated from the underground ore body to the ground is characterized by that: the number of channels is 12, 6 measuring points can be completed at a time in a tensor observation manner, 9 measuring points can be completed at a time in a scalar measurement, recordation and storage of full waveform time series are available, the number of sampling bits is 24, synchronization of the collecting station is realized by a constant temperature crystal, a GPS, or an atomic clock, the collecting station has a power frequency rejection ratio of greater than 70 dB, a power consumption of 13 W, a weight of 3 kg, a size of 228*200*115 mm, the collecting station includes a magnetic sensor, wherein a frequency bandwidth of the magnetic sensor is 0.0625 Hz-10 kHz, a noise level of the magnetic sensor is 1 pT/√Hz@1 Hz, 0.1 pT/√Hz@10 Hz, <0.01 pT/√Hz@>100 Hz, a supply voltage of the magnetic sensor is ±9V to ±15V, an operating temperature of the magnetic sensor is −30° C. to +70° C., the weight of the magnetic sensor is 3 kg, the length of the magnetic sensor is 800 mm, and the diameter of the magnetic sensor is 60 mm.

Further, the step for collecting the electromagnetic wave signals propagated from the underground ore body to the ground specifically includes: disposing 12 sets of CLEM systems in a measuring line in a due south-north MT manner; setting the due north as a positive direction of x-axis, and setting the due east as a positive direction of y-axis, wherein z-axis is oriented vertically downward; recording a due south-north electric field as Ex and a due east-west electric field as Ey; arranging a magnetic bar by burying the magnetic bar, sealing a junction of the magnetic rod to a wire with a rubber glove; and measuring a ground resistance and setting parameters.

Further, the step for processing the electromagnetic wave signals propagated from the underground ore body to the ground includes: using 3 software for processing, wherein the 3 software include: TSSplit software configured to segment an original time series file according to a transmission time of each frequency so that time domain data corresponding to the transmission time of each frequency is saved in one file so as to be free from the interference of signals transmitted in other periods when a spectrum analysis is performed; WEMPro software configured to perform the spectrum analysis of independent time domain data generated by the TSSplit software to obtain electromagnetic spectrum data and Cagniard resistivity and impedance phase data, and then storing the electromagnetic spectrum data and the Cagniard resistivity and impedance phase data in a custom iRES file; PlotWEMResult drawing software configured to read the iRES file generated by the WEMPro software and automatically output the spectrum of a single frequency, the spectrum of all frequency points, and an electromagnetic field, the Cagniard resistivity and a phase curve.

The advantages of the present invention are as follows. The WEM-based method for deep resource detection using sky waves has established a theoretical model of full-space sky wave coupled propagation in "ionosphere-atmosphere-rock layer" and compared the response curves of different models in full-space (earth-atmosphere-ionosphere) and traditional uniform half-space (earth-atmosphere). The results show that the sky wave propagates in the atmosphere as a waveguide and changes the traditional theory that the sky wave attenuates according to the third power of the distance, leading to a conclusion of slow attenuation and far propagation.

The invention has developed a sky wave signal receiver which utilizes the existing WEM communication system (the antenna length is 60 km, the transmission frequency is 0.1-300 Hz and the transmitter power is 500 KW) in South Central China to transmit artificial source electromagnetic signals upto thousands of kilometers and high signal-noise ratio, which are used for high-precision electrical structure exploration in the oil and gas exploration and metal detection area within the depth of 10 km.

DETAILED DESCRIPTION OF THE INVENTION

The specific embodiments of the present invention are described below with reference to the drawings.

Propagation Principle of Sky Wave Communication

Figure 1A:
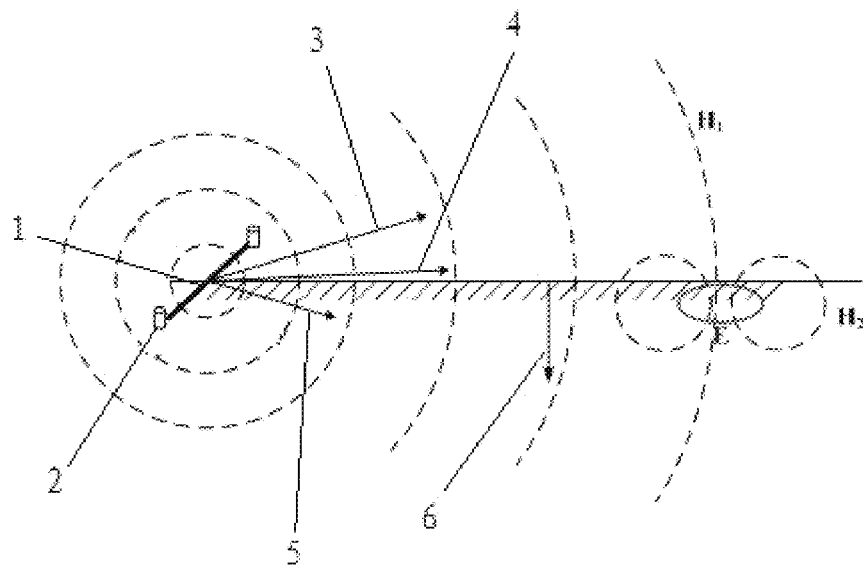
FIG. 1A is a schematic diagram of artificial source electromagnetic transmission.

The electromagnetic waves generated by the terrestrial transmitting antenna are transmitted to the air and underground in all directions. According to the propagation path of electromagnetic waves, the electromagnetic wave can be divided into the formation wave, the ground wave, and the sky wave, as shown in FIG. 1A. FIG. 1A includes transmitter 1, dipole source 2, sky wave 3, ground wave 4, formation wave 5, and horizontal polarization 6, whereby the ground can produce near-field, far-field and waveguide field. Ground wave refers to the electromagnetic waves propagating along the surface, and the formation wave refers to the electromagnetic waves propagating under the ground. In the method of traditional artificial source electromagnetic detection, the ground and formation waves are mainly used for near-field and far-field detection.

Figure 1B:
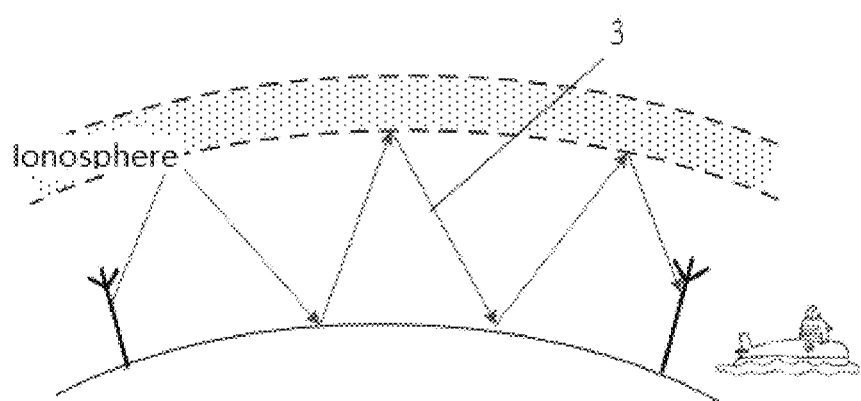
FIG. 1B is a schematic view of sky wave radio communication.

The electromagnetic waves emitted by the ground transmitting station, reflected or refracted by the ionosphere in the sky and then returned to the ground are called sky waves. They can be transmitted by means of the reflection of the ionosphere like a mirror. After reaching the ground, they are reflected again to the ionosphere and then returned to the ground by the ionosphere. Through these several reflections, the electromagnetic wave can travel long distances and can be used in remote communication, as shown in FIG. 1B. In order to obtain the sky wave signal of sufficient intensity, it is common to choose a high-resistance region with a certain depth range and area on land and set up a transmitting antenna of tens or hundreds of kilometers with grounding electrodes connected with the earth at both ends. The transmitting system forms an alternating loop with the earth.

Working Principle of Prospection using Sky Wave

The WEM method is an artificial source electromagnetic method whose principle is similar to that of the controlled-source audiomagnetotelluric (CSAMT) method, that is, transmitting an electromagnetic signal through an artificial source and receiving a signal at a distance from the transmitting source. The difference is that the WEM method has established a fixed high-power transmitting source with a signal of nationwide coverage and 10-20 dB signal to noise ratio. It has the advantages of large detection depth and low cost of the MT method, and it also owns the characteristic of strong anti-interference ability and high detection accuracy of the artificial source electromagnetic method (CSAMT). It is a new method and technology of underground resource detection and seismic geomagnetic monitoring.

Figure 2:
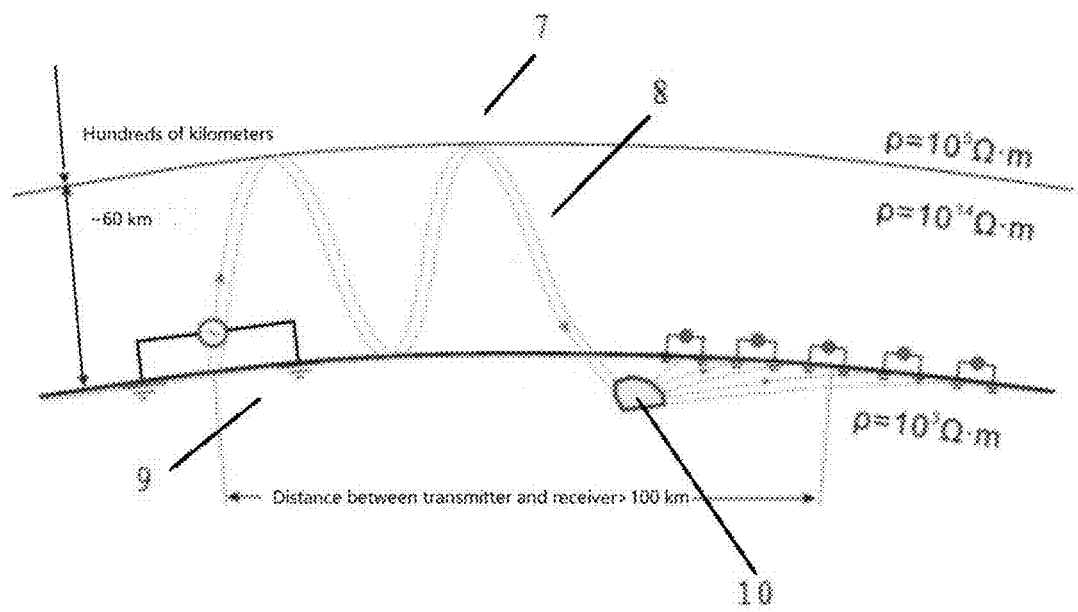
FIG. 2 is a schematic diagram of the working principle of WEM.

The signal of the WEM method is injected into the ground by a fixed, approximately 100-kilometer-long grounding wire with hundreds of amps of electromagnetic waves that radiate underground, along the surface, and upwards. The difference of WEM method from the CSAMT method lies in the existence of the sky wave, making the WEM method an innovative method. The sky wave propagates upwards to the ionosphere, is reflected to the underground ore-body by the ionosphere, and finally spreads from the underground ore body to the ground. The existence of sky waves slows down the decay rate of the electromagnetic wave energy so as to make the penetration depth of electromagnetic waves larger and achieve the purpose of deep exploration. The working principle is shown in FIG. 2. FIG. 2 includes ionosphere 7, atmosphere 8, rock layer 9, ore-body 10.

As shown in FIG. 2, in fact, the sky wave spreads underground after it is reflected from the ionosphere to the ground and finally returns to the ground after being coupled with underground orebodies. The underground target body's occurrence characteristics can be speculated by collecting and processing the electromagnetic signal from the underground target body.

Establishment of New Mathematical Model of Sky Wave Propagation

When active, varying electromagnetic field satisfies the following Maxwell equations.

Figure 3A:
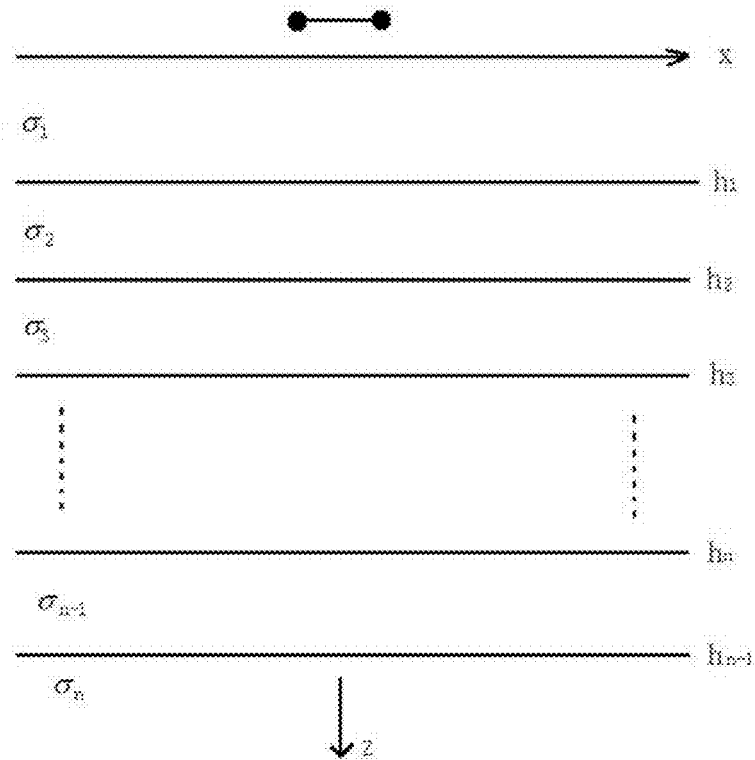
FIG. 3A is a diagram of the traditional half-space model.
Figure 3B:
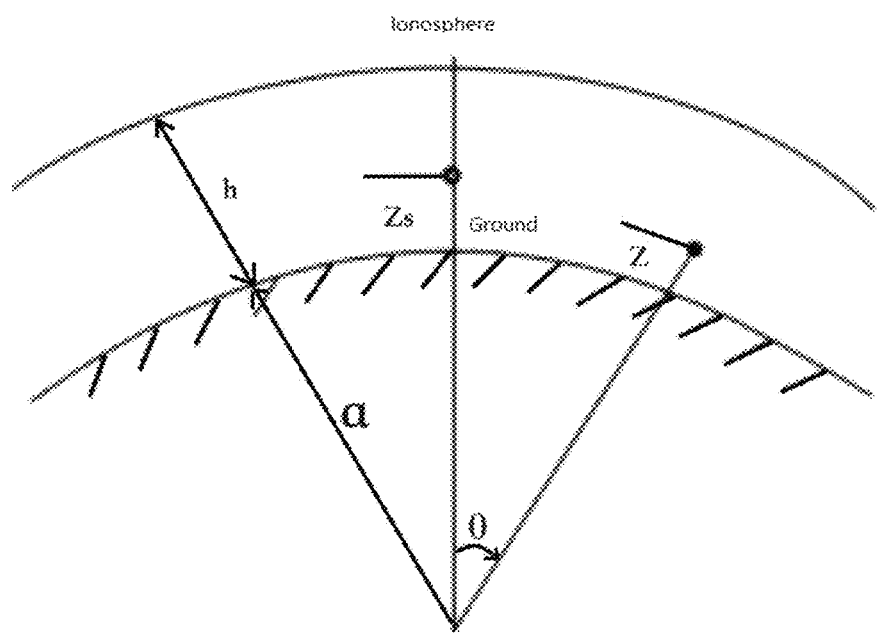
FIG. 3B is a diagram of full space model of sky wave.

For a horizontal electric dipole (long wire) on a horizontally layered surface, as shown in FIG. 3A and FIG. 3B, the center of the horizontal electric dipole source (dl) or long wire source (2L) is at the origin of the cylindrical coordinate with the height H from the ground. The horizontal electric dipole source or long wire source is placed along the x-axis ($\varphi=0$), and the z-axis is directed downwards. The media under the earth comprises a series of horizontal layers, the conductivity and thickness of each layer are $\sigma_n$ and $h_n$, respectively.

Under the cylindrical coordinate system, the ground wave generated by the horizontal electric dipole on the surface of layered media is given by:

$$E_\phi \approx \frac{Idl\sin\phi}{\pi\sigma r^3} \tag{6}$$

$$E_z \approx \frac{\sqrt{\omega\mu_0}}{2\pi\sqrt{\sigma}} \frac{Idl\cos\phi}{r^2} e^{i\frac{\pi}{4}} \tag{7}$$

$$H_r \approx \frac{Idl\sin\phi}{\pi\sqrt{\omega\mu_0\sigma}\, r^3} e^{-i\frac{\pi}{4}} \tag{8}$$

$$H_\phi \approx -\frac{Idl\cos\phi}{2\pi\sqrt{\omega\mu_0\sigma}\, r^3} e^{-i\frac{\pi}{4}} \tag{9}$$

$$H_z \approx -\frac{3Idl\sin\phi}{2\pi\omega\mu_0\sigma r^4} e^{-i\frac{\pi}{4}} \tag{10}$$

Where I is the transmit current, R is the distance between the transmitting source and the receiver, dl is the length of the dipole, $\varphi$ is the angle between the source and the receiver, r is the radius in the X-axis, $\mu$ is the permeability, and $\omega$ is the angular frequency, $n_i^2 = m^2 - k_i^2$, $k_i = \sqrt{i\omega\mu\sigma_i}$, $J_0$ and $J_1$ are the zeroth order and the first order of the Bessel function, respectively, $h_p = z_p - z_{p-1}$ is the thickness of the pth layer, $\rho_p$ is the resistivity of the pth layer, and coth is the hyperbolic cotangent equation. $\mu_0$ is the vacuum permeability, $\sigma$ is the conductivity of the homogeneous medium.

The above six equations show that in a homogeneous medium, the horizontal component of the dipole ground wave is proportional to the resistivity of the medium, regardless of frequency. The horizontal component of the magnetic field is inversely proportional to the square root of the product of the frequency and the conductivity of the medium. The horizontal component of the far-field electromagnetic field attenuates with $r^3$.

When a current source is used, the distance between the power supply electrodes A and B can be up to the magnitude of 100 km. The quantitative effect of the ionospheric structure on the electromagnetic waves excited by the high-power fixed sources must be considered first. The electrical properties of the ionosphere are completely different from those of the solid earth medium and the atmosphere. The response of the sky wave is:

$$H_r = -\frac{Idl\sin\varphi}{2\pi r} \left[ \int_0^\infty \frac{m}{m+n_1/R^*} J_1(mr)dm + r\int_0^\infty \frac{n_1}{R^*} \frac{m}{m+n_1/R^*} J_0(mr)dm \right] \tag{11}$$

$$H_\varphi = \frac{Idl}{2\pi r}\cos\varphi \int_0^\infty \frac{n_1}{R^*} \frac{m}{m+n_1/R^*} J_1(mr)dm \tag{12}$$

$$H_z = \frac{Idl}{2\pi}\sin\varphi \int_0^\infty \frac{m^2}{m+n_1/R^*} J_1(mr)dm \tag{13}$$

-continued $$E_r = \frac{Idl}{2\pi}\cos\varphi\left[\frac{i\omega\mu}{r}\int_0^\infty \frac{J_1(mr)dm}{m+n_1/R^*} - \right.$$
$$\left. \rho_1\int_0^\infty \frac{n_1 m}{R}J_0(mr)dm + \frac{\rho_1}{r}\int_0^\infty \frac{n_1}{R^*}J_1(mr)dm\right] \quad (14)$$

$$E_\varphi = \frac{Idl}{2\pi}\sin\varphi\left[-i\omega\mu\int_0^\infty \frac{mJ_0(mr)dm}{m+n_1/R^*} + \right.$$
$$\left. \frac{\rho_1}{r}\int_0^\infty \frac{n_1}{R}J_1(mr)dm + \frac{i\omega\mu}{r}\int_0^\infty \frac{J_1(mr)}{m+n_1/R^*}dm\right] \quad (15)$$

Where, $R^* = \coth\left[n_1 h_1 + \coth^{-1}\frac{n_1}{n_2}\coth\left(n_2 h_2 + \ldots + \coth^{-1}\frac{n_{N-1}}{n_N}\right)\right]$ $R = \coth\left[n_1 h_1 + \coth^{-1}\frac{n_1}{n_2}\frac{\rho_1}{\rho_2}\coth\left(n_2 h_2 + \ldots + \coth^{-1}\frac{n_{N-1}}{n_N}\frac{\rho_{N-1}}{\rho_N}\right)\right]$ Where I is the transmit current, R is the distance between the transmitting source and the receiver, dl is the length of the dipole, φ his the angle between the transmitting source and the receiver, r is the radius in the X-axis, μ is the permeability, and ω is the angular frequency, $n_i^2 = m^2 - k_i^2$, $k_i = \sqrt{i\omega\mu\sigma_i}$, $J_0$ and $J_1$ are the zeroth order and the first order of the Bessel function, respectively, $h_p = z_p - z_{p-1}$ is the thickness of the pth layer, $\rho_p$ is the resistivity of the pth layer, and coth is the hyperbolic cotangent equation.

From the above formula, we can see that the horizontal component of the sky wave attenuates with $r^3$ according to the propagation half-space theoretical model. The horizontal component of the sky wave attenuates with r according to the new model of the full space sky wave. This new theory amends the traditional theory that the sky wave attenuates with the third power of the distance.

Slow Attenuation Characteristics of Sky Wave

Figure 4A:
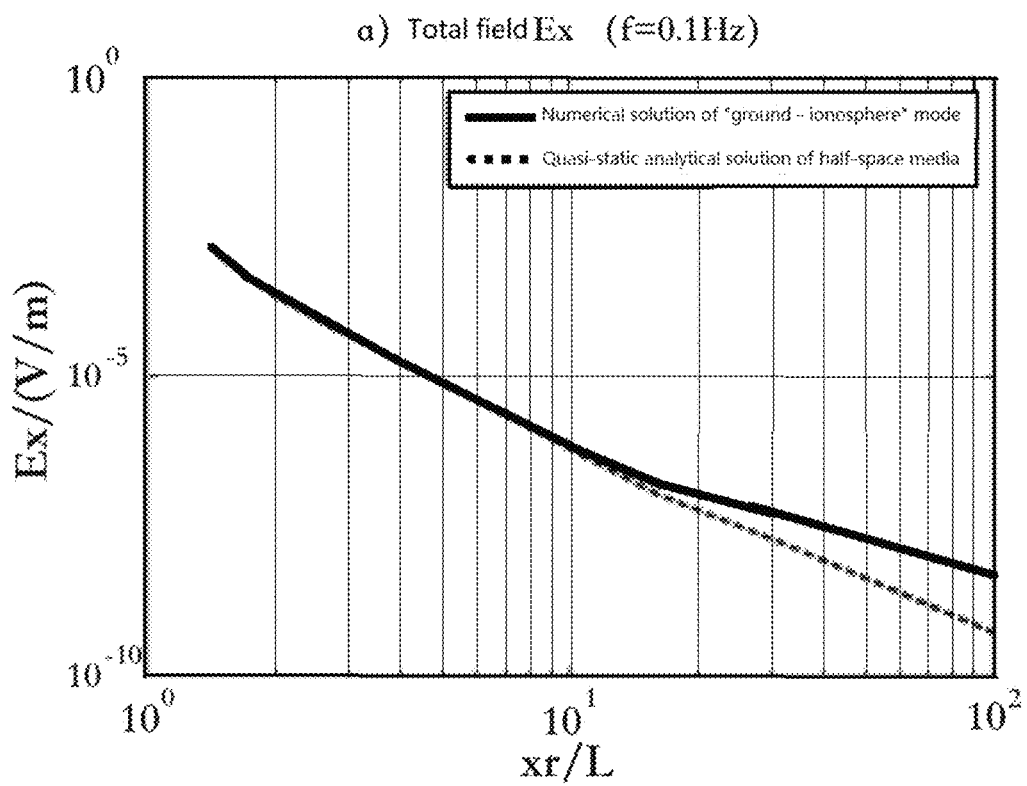
FIG. 4A, FIG. 4B and FIG. 4C are the attenuation curves of Ex field under the conditions that f=0.1 Hz, f=5 Hz, and f=300 Hz, respectively.
Figure 4B:
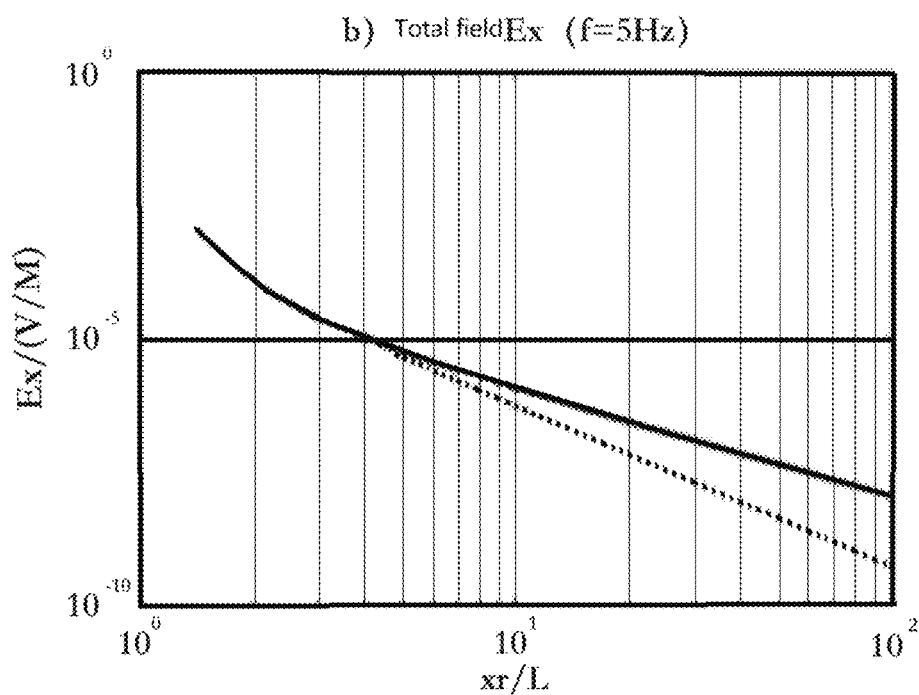
Figure 4C:
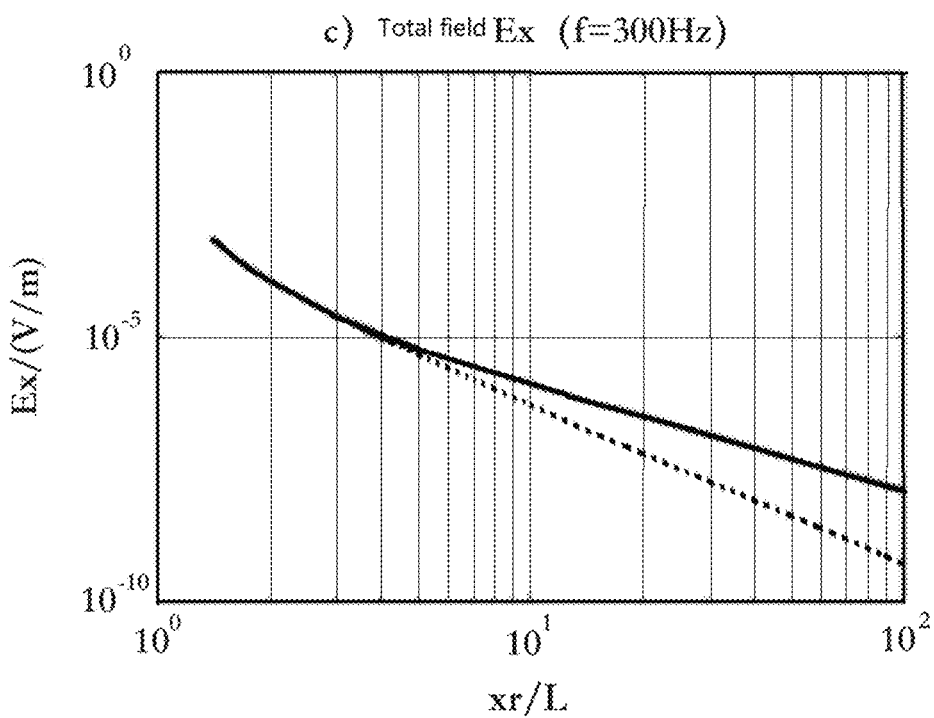

FIGS. 4A, 4B, and 4C show the attenuation curves of the Ex field at frequencies of 0.1 Hz, 5 Hz, and 300 Hz, respectively. The solid line represents the simulation curve of the full space field, and the broken line represents the attenuation curve of the earth medium quasi-stationary field in the uniform half-space (The 50-kilometer-long cable is divided into 50 pieces of 1 km in length. Each piece is calculated according to the dipole field analytical formula. The total field of the 50-kilometer long cable can be obtained from the linear superposition of the results of the 50 dipoles in different locations). The results clearly show that the calculated curve (the broken line) and the full-space curve (the solid line) taking the above factors into account is consistent when under the quasi-stationary field near the field resource, regardless of the effect of the ionosphere and the air current. When the length of the finite cable is equal to the height of the ionosphere, the ionosphere has a significant effect on the electromagnetic wave field generated by the long dipole source at a long distance, and the curves no longer match. As the frequency increases, this difference manifests itself at a closer distance.

The solid line shows full space (earth-atmosphere-ionosphere), and the broken line shows uniform half space (earth-atmosphere).

Plane Distribution of Sky Wave

Figure 5A:
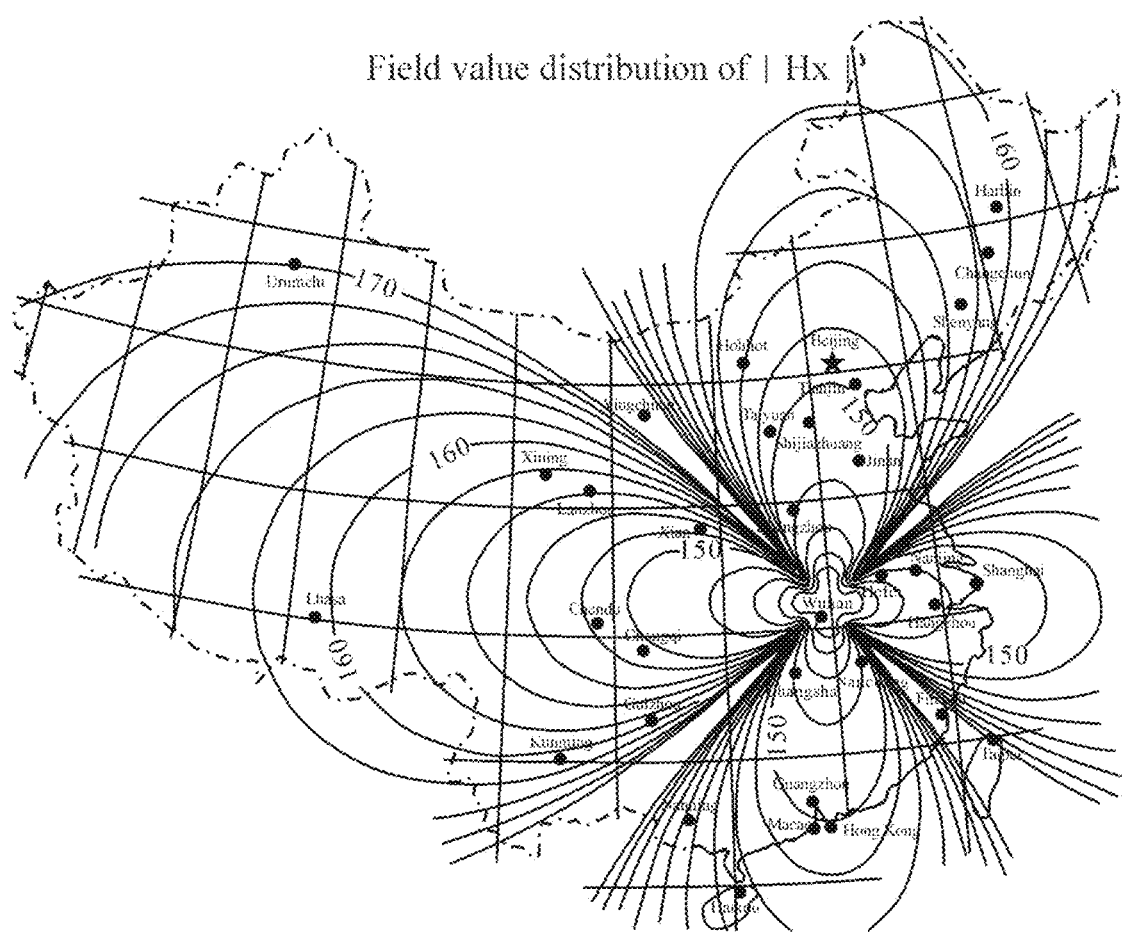
FIG. 5A and FIG. 5B are magnetic field map of $|H_x|$ and $|H_y|$ in Cartesian coordinates, respectively.
Figure 5B:
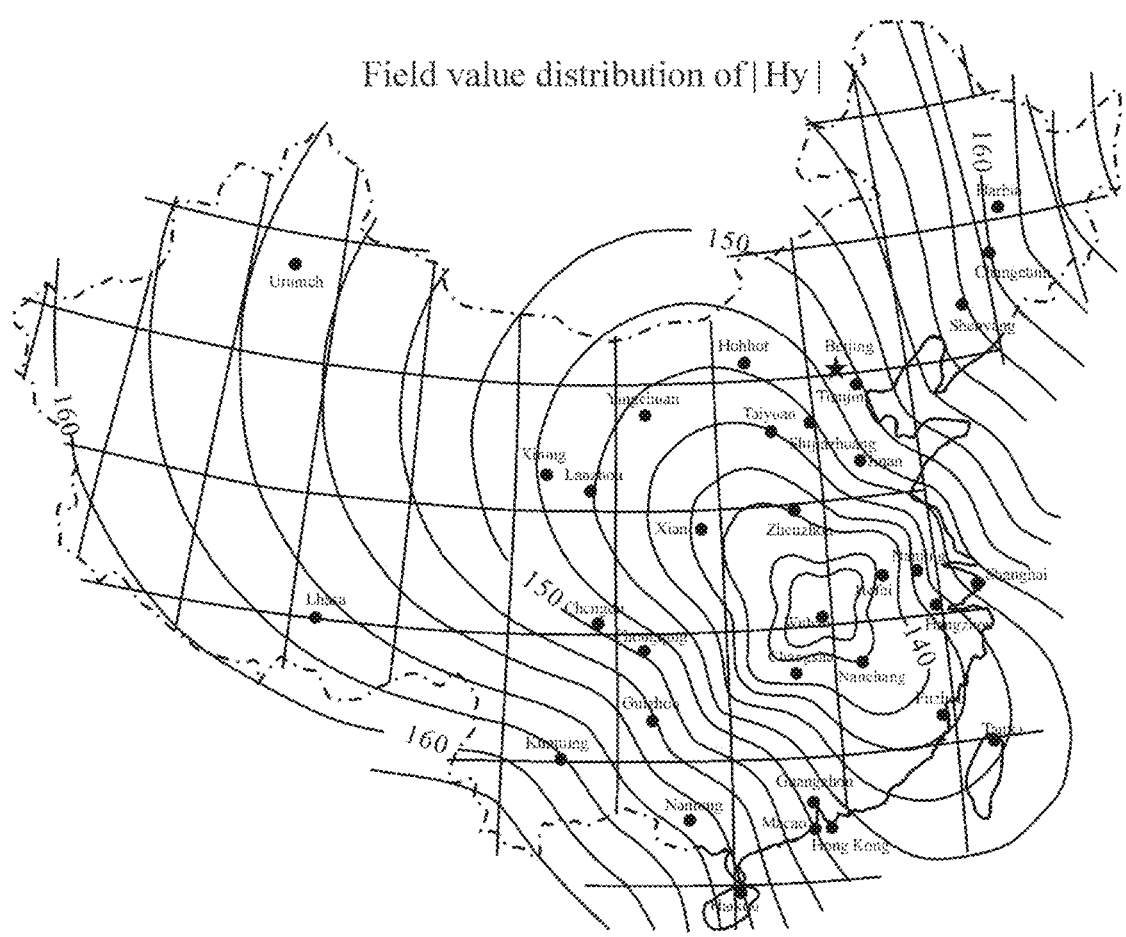

According to the position of the model test stand, the contour map of the field strength distribution of 90 Hz transmission frequency of the model test stand is calculated. Therefore, only the case where the east-west transmitting antenna emits separately is selected for numerical simulation. The transmitting antenna is 80 km long and is arranged along the x-axis. The midpoint is located at the origin of coordinates and the transmitted current is 200 A. The calculated frequency takes an integer power of 2 within the working frequency band of the very low frequency electromagnetic method and reaches 12 frequencies from $2^{-3}$ to $2^8$ in total. The "ground-ionosphere" model parameters are: ionospheric resistivity $\rho_{-1}=10^4$ Ω·m, ionospheric height h=100 km, air layer resistivity $\rho_n=10^{14}$ Ω·m, and underground half-space background resistivity $\rho_1=5000$ Ω·m. FIG. 5A and FIG. 5B are magnetic field map of $|H_x|$ and $|H_y|$ in Cartesian coordinates respectively. The distribution of the magnetic field intensity values shown in the figure can provide a basis for our future work.

The results of FIG. 5A and FIG. 5B show that for a large dipole field source that can operate over hundreds to thousands of kilometers, an extra waveguide region is demarcated where the electromagnetic field component has many different features. These differences are mainly reflected in that: 1) the amplitude of the electromagnetic field attenuates more slowly; 2) the directional diagram of the field source changes; 3) the relative position of the zone conducive to the measurement of the impedance $Z_{xy}$ and $Z_{yx}$ has changed; 4) a polarized ellipse of electric and magnetic fields appears; 5) the long axis of the polarization ellipse of the waveguide field changes in comparison with the vector direction of the quasi-stationary field.

Development of Collecting Device of Sky Wave

Performance of the collecting station: the number of channels is 12, 6 measuring points can be completed at a time in a tensor observation manner, 9 measuring points can be completed at a time in a scalar measurement, recordation and storage of full waveform time series are available, the number of sampling bits is 24, synchronization of the collecting station is realized by a constant temperature crystal, a GPS, or an atomic clock, the collecting station has a power frequency rejection ratio of greater than 70 dB, a power consumption of 13 W, a weight of 3 kg, a size of 228*200*115 mm, the collecting station includes a magnetic sensor, wherein a frequency bandwidth of the magnetic sensor is 0.0625 Hz-10 kHz, a noise level of the magnetic sensor is 1 pT/√Hz@1 Hz, 0.1 pT/√Hz@10 Hz, <0.01 pT/√Hz@>100 Hz, a supply voltage of the magnetic sensor is ±9V to ±15V, an operating temperature of the magnetic sensor is −30° C. to +70° C., the weight of the magnetic sensor is 3 kg, the length of the magnetic sensor is 800 mm, and the diameter of the magnetic sensor is 60 mm.

Figure 6:
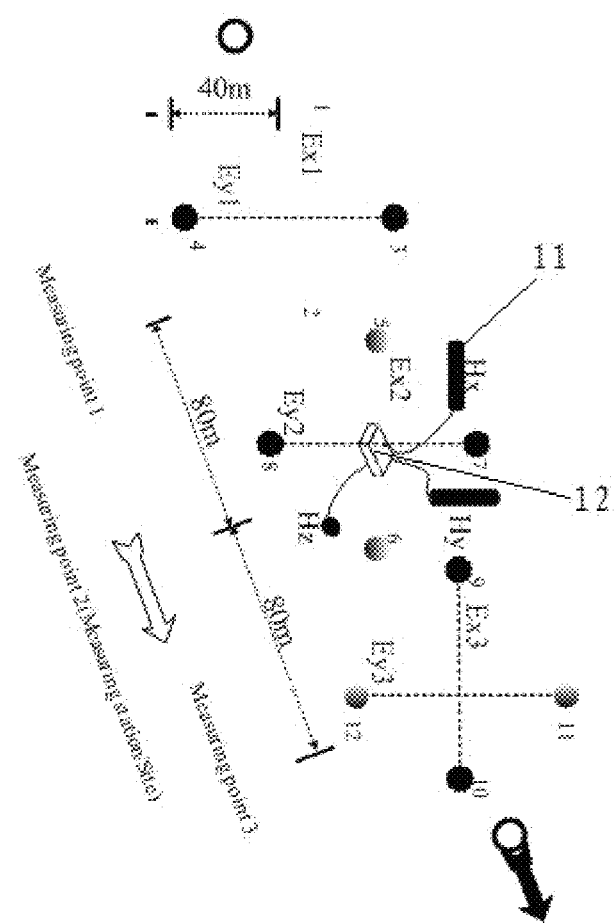
FIG. 6 is a diagram of MT layout of the single set receiving system (Ex is south-north direction, Ey is east-west direction).

Method Research of Data Collection 12 sets of CLEM system in the measuring line use the positive south-north MT mode, as shown in FIG. 6. FIG. 6 includes a magnetic bar 11 and a receiver 12. The due north is set as the positive x-axis, the due east is set as the positive y-axis, and the z-axis is vertically downward. The due south-north electric field is Ex and the due east-west electric field is Ey. In order to ensure that high-quality magnetic field data could be obtained, the magnetic bar is buried and sealed with a rubber glove at the junction of the magnetic rod when arranging the magnetic bar so as to achieve the purpose of rainproofing and waterproofing. When laying the electrode line encounters the highway, the electrode line will be buried to minimize interference. The measurement of the ground resistance and the parameters setting should be performed before measuring. After the parameter setting is completed and the instrument is covered, all staff should leave when the instrument starts to collect normally.

Developing Data Processing Software

WEM acquisition refers to the time domain data acquisition with 2.4 kHz sampling rate. The preliminary data processing is carried out for spectrum analysis of the time domain data, getting access to the original electromagnetic spectrum and the Cagniard resistivity and impedance phase data, and drawing the curves of the original electromagnetic spectrum, Cagniard resistivity and impedance phase. 3 supporting software are used.

(1) The TSSplit software is used to segment the original time series file according to the transmission time of the frequency, so that the time domain data corresponding to the transmission time of each frequency is saved in one file, so as to be free from the interference of the signals transmitted in other periods when the spectrum analysis is performed;

(2) The WEMPro software is used for spectrum analysis of independent time domain data generated by TSSplit software to obtain the electromagnetic spectrum data and Cagniard resistivity and impedance phase data, and then store them in a custom iRES file;

(3) PlotWEMResult drawing software is used to read the iRES file generated by the WEMPro software, and automatically outputs the spectrum of a single frequency, the spectrum of all frequency points and the electromagnetic field, Cagniard resistivity and phase curve.

In the following example, the survey site is in the cross-section of the cross location between Lingshui Village, Sichuan Province and Changshou Village, Chongqing, which is 700 km from the transmitting source. There is an anticline closure and fault zone suitable for oil storage conditions. The purpose of this survey is to test the stability and validity of the method that obtains the measured data based on WEM so as to demonstrate the feasibility of using WEM method to detect hydrocarbon resources.

Figure 7:
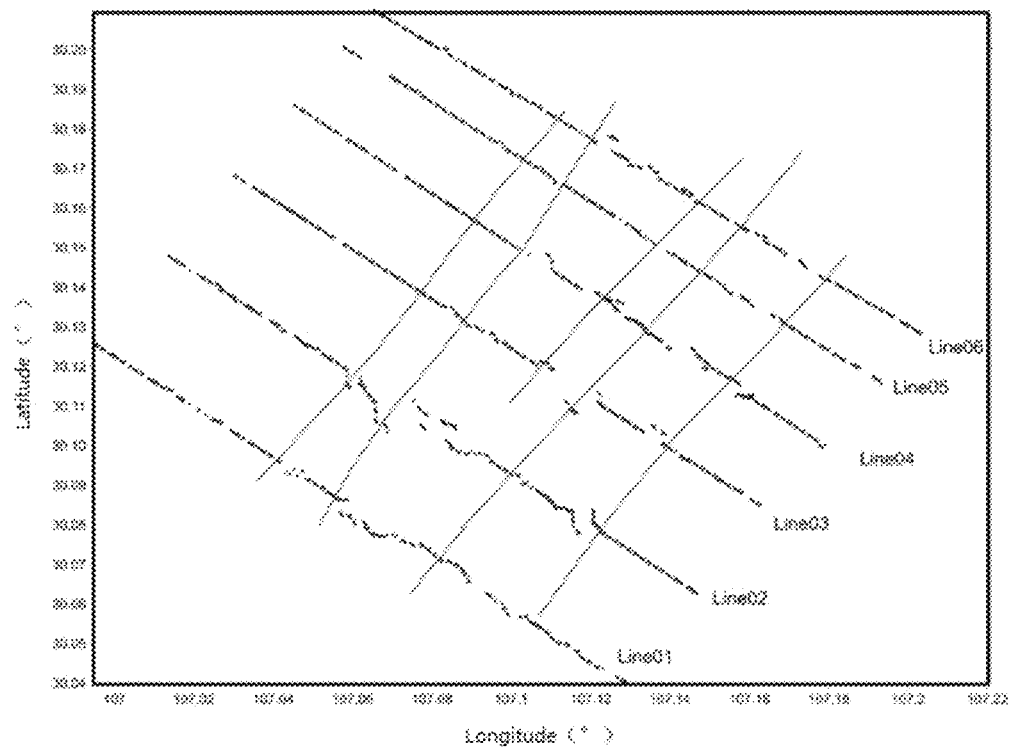
FIG. 7 is the location of the measuring line.

FIG. 7 is the location of the measuring line where the transmitting antenna is orientated from west to east. Table 1 is a comparison data of the electric field amplitude and background noise. As shown in Table 1, a total of 30 CLEM recording systems with a frequency of 36 were used. In addition, six measuring lines (1-6) with the range of 2 km and 1355 measuring points with the range of 50 m were designed.

Figure 8:
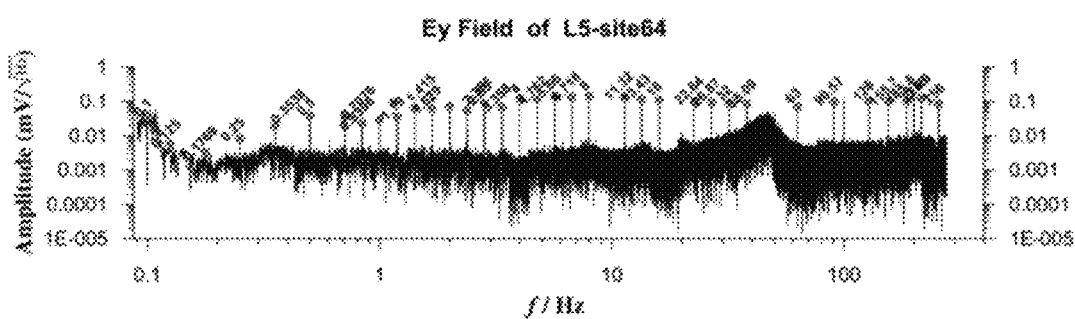
FIG. 8 is the electric field spectra collected from the measuring point 64 of measuring line 5.

FIG. 8 shows the electric field spectra collected from the measuring point 64 of measuring line 5. The horizontal axis is the frequency and the vertical axis is the amplitude of the electric field. The relative intensities of the signals at different frequencies can be clearly seen directly from the FIG. 8. The signals at medium to high frequencies and high frequencies appear to be stronger, and the measurement points begin to approach the transmitting source. The signal-to-noise ratio of the signal causes the mid-frequency range to become higher. The 50 Hz signal is seriously deformed due to human activities.

TABLE 1

| Frequency (Hz) | Background noise N mV/km/√Hz | Recorded signal S mV/km/√Hz | Signal-to-noise ratio S/N |
|---|---|---|---|
| 256 | 0.0041 | 0.0299 | 7.2 |
| 128 | 0.0044 | 0.0421 | 9.6 |
| 90.57 | 0.0062 | 0.0529 | 8.5 |
| 45.28 | 0.0446 | 0.0157 | 0.4 |
| 32 | 0.0054 | 0.0560 | 10.4 |
| 22.64 | 0.0042 | 0.0712 | 17.0 |
| 16 | 0.0049 | 0.0500 | 10.2 |
| 11.32 | 0.0046 | 0.0500 | 10.8 |
| 8 | 0.0044 | 0.0472 | 10.8 |
| 5.66 | 0.0041 | 0.0500 | 12.1 |
| 4 | 0.0033 | 0.0472 | 14.4 |
| 2.83 | 0.0033 | 0.0472 | 14.4 |
| 2 | 0.0029 | 0.0472 | 16.1 |
| 1.415 | 0.0041 | 0.0398 | 9.6 |
| 1 | 0.0033 | 0.0375 | 11.4 |

TABLE 1-continued

| Frequency (Hz) | Background noise N mV/km/√Hz | Recorded signal S mV/km/√Hz | Signal-to-noise ratio S/N |
|---|---|---|---|
| 0.7076 | 0.0037 | 0.0299 | 8.1 |
| 0.5 | 0.0037 | 0.0282 | 7.7 |
| 0.3538 | 0.0078 | 0.0235 | 3.0 |
| 0.25 | 0.0083 | 0.0210 | 2.5 |
| 0.1769 | 0.0167 | 0.0026 | 0.2 |
| 0.125 | 0.0355 | 0.0088 | 0.2 |
| 0.1 | 0.0299 | 0.0187 | 0.6 |

Table 1 lists the background noise of different levels and the valid signal amplitude of 22-band. The table shows that the signal to noise ratio of 10 is in the high-frequency range. Signal to noise ratio of the signal is greater than 20 dB.

Figure 9A:
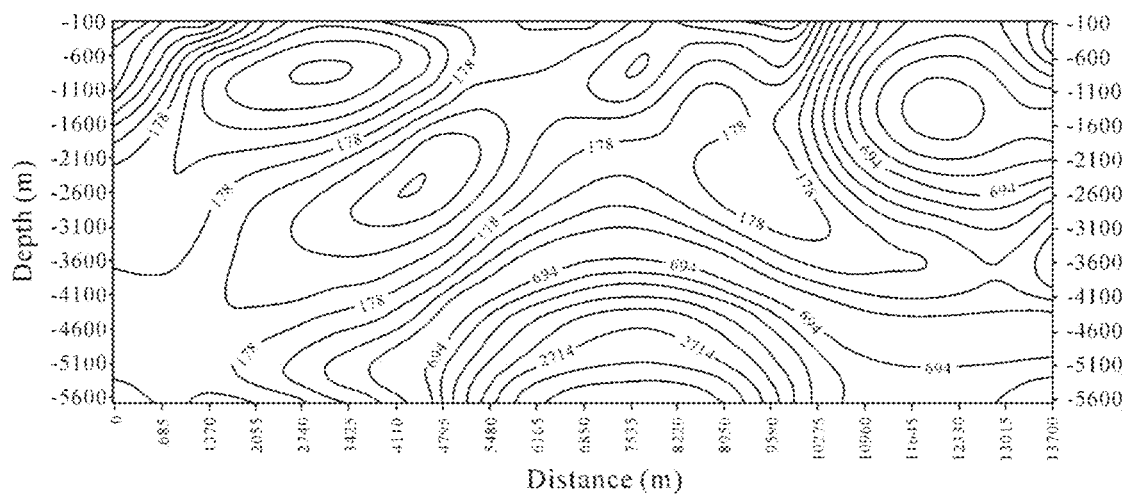
FIG. 9A is a cross-section of "Resistivity and Depth" measured by the sky wave system.
Figure 9B:
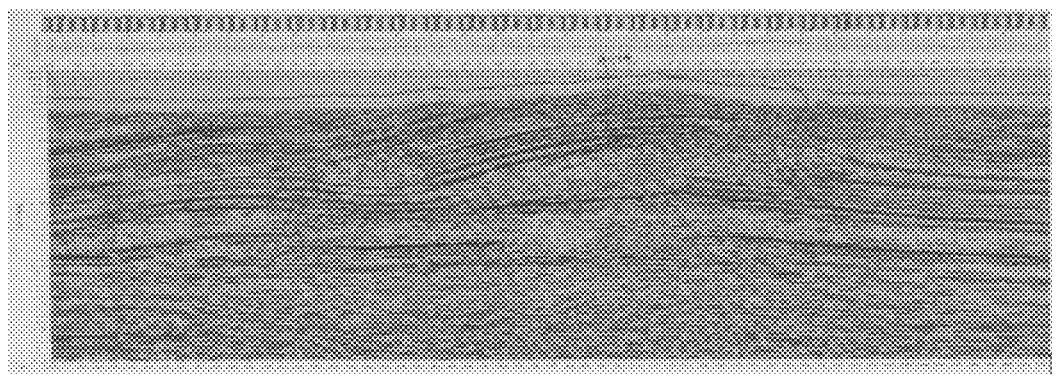
FIG. 9B is a cross-section of a seismic survey.

FIG. 9A is a cross-section of "Resistivity and Depth" measured by the sky wave system, and FIG. 9B is a cross-section of a seismic survey.

FIG. 9A is 2D "plane inversion" cross-section of the resistivity and depth. As can be seen from the figure, the resistivity is intermittent, so the geographical structure of the test area is very complicated. Both ends of the cross-section can be identified as the Jurassic strata, with the Permian Qixia and Liangshan Formation and the Carbonaceous Huanglong Formation in the middle. Both sides of the mid- and high-resistivity zones from −4000 to −4600 m are the junctions of Permian and "carbon-based", respectively. This is consistent with the top of the oil-bearing layer above the seismic profile.

With the continuous and rapid development of our national economy, the contradictions of insufficient resources have become increasingly prominent. Strengthening the exploration of underground resources has become a strategic choice for maintaining the sustainable development of our economy. At present, there are fewer and fewer surface outcrops and shallow mines that are easily found, easily identified and easily detected in our country's underground resources, and the hidden resources and deep resources have become the main bodies for the exploitation of underground resources in China in the future. Conventional artificial source electromagnetic exploration parameters: the current source length of 1-2 km, the transmitting frequency of 0.1-300 Hz, transmitter power 30 KW, the detection range of within 5-10 km, detection depth of 0.5-2 km. "deep zone detecting and blind zone searching" is the main direction of detection and development of underground resources in our country. The difficulty of detection is increasing sharply. The risk and cost of finding underground resources are getting higher and higher. It is urgent to research and develop underground resources exploration means with the advantages of strong penetrating ability, wide application, and economic convenience.

The basic idea of the so-called large-scale artificial source electromagnetic sounding method is to select a region to build a large fixed current transmitting source. The current source length of hundreds of kilometers, the transmitting frequency of 0.1-300 Hz, transmitter power is 500 KW, observation is carried out with 30-100 receivers, the signal strength of 20 DB higher than the natural source, the signal coverage is 2000-3000 km, and the detection depth is 0.5-10 km. The American scientists jumped to propose the idea that applying the very low frequency electromagnetic technology to the field of geophysics and earthquake prediction, which has not been realized.

The present invention proposes a new method of deep detection using sky waves to improve the traditional "atmospheric-lithosphere" half-space propagation theory into a full-space "sky wave" theory of "ionosphere-atmosphere-rock layer", and develop a receiving device for sky wave signal. Through theoretical model calculation and actual data measurement, we can see that it is possible to use the sky wave for detection within the scope of China's national territory to realize the high-precision electrical structural exploration within a depth of 10 kilometers and open a new era of artificial source electromagnetic detection.

The above is the preferred embodiment of the present invention, and it should be noted that, those skilled in the art may make various improvements and modifications without departing from the principle of the present invention, and these improvements and modifications should be regarded as the protection scope of the present invention.

We claim:

1. A Wireless Electromagnetic (WEM)-based method for deep resource detection using a sky wave, comprising:
    obtaining an electromagnetic wave through a signal source using a WEM method;
    causing the electromagnetic wave to propagate upward to form a sky wave wherein the sky wave propagates to an ionosphere and is reflected to an underground at least one target ore-body by the ionosphere and finally propagates from the underground at least one target ore-body to the ground, via a ground wave;
    collecting the ground wave propagated from the underground at least one target ore-body to the ground;
    measuring propagation characteristics of the ground wave;
    determining attenuation caused to the ground wave;
    establishing a mathematical model of propagation of the ground wave;
    processing the ground wave propagated from the underground at least one target ore-body to the ground based on a slow-attenuation characteristic of the ground wave and a plane distribution characteristic of the ground wave;
    determining a magnetic field intensity distribution on the ground;
    defining a magnetic field map and its Cartesian coordinates; and
    identifying a location of the underground at least one target ore-body using the magnetic field intensity distribution and the magnetic field map.

2. The Wireless Electromagnetic (WEM)-based method according to claim 1, wherein the mathematical model includes the following formulas:

$$H_r = -\frac{Idl\sin\varphi}{2\pi r} \tag{1}$$

$$\left[\int_0^\infty \frac{m}{m+n_1/R^*} J_1(mr)dm + r\int_0^\infty \frac{n_1}{R^*} \frac{m}{m+n_1/R^*} J_0(mr)dm\right]$$

$$H_\varphi = \frac{Idl}{2\pi r}\cos\varphi \int_0^\infty \frac{n_1}{R^*} \frac{m}{m+n_1/R^*} J_1(mr)dm \tag{2}$$

$$H_z = \frac{Idl}{2\pi}\sin\varphi \int_0^\infty \frac{m^2}{m+n_1/R^*} J_1(mr)dm \tag{3}$$

$$E_r = \frac{Idl}{2\pi}\cos\varphi\left[\frac{i\omega\mu}{r}\int_0^\infty \frac{J_1(mr)dm}{m+n_1/R^*} - \right.$$

$$\left. \rho_1 \int_0^\infty \frac{n_1 m}{R} J_0(mr)dm + \frac{\rho_1}{r}\int_0^\infty \frac{n_1}{R^*} J_1(mr)dm\right] \tag{4}$$

$$E_\varphi = \frac{Idl}{2\pi}\sin\varphi\left[-i\omega\mu \int_0^\infty \frac{mJ_0(mr)dm}{m+n_1/R^*} + \right.$$

$$\left. \frac{\rho_1}{r}\int_0^\infty \frac{n_1}{R} J_1(mr)dm + \frac{i\omega\mu}{r}\int_0^\infty \frac{J_1(mr)}{m+n_1/R^*}dm\right] \tag{5}$$

where, $R^* = \coth\left[n_1 h_1 + \coth^{-1}\frac{n_1}{n_2}\coth\left(n_2 h_2 + \ldots + \coth^{-1}\frac{n_{N-1}}{n_N}\right)\right]$, $R = \coth\left[n_1 h_1 + \coth^{-1}\frac{n_1}{n_2}\frac{\rho_1}{\rho_2}\coth\left(n_2 h_2 + \ldots + \coth^{-1}\frac{n_{N-1}}{n_N}\frac{\rho_{N-1}}{\rho_N}\right)\right]$, where I is a transmit current, R is a distance between the transmitting source and a receiver, dl is the length of a dipole, $\varphi$ is an angle between the transmitting source and the receiver, r is a radius in an X-axis, $\mu$ is permeability, $\omega$ is an angular frequency $n_i^2 = m^2 - k_i^2$, $k_i = \sqrt{i\omega\mu\sigma}$, $J_0$ and $J_1$ are a zeroth order and a first order of Bessel function, respectively, $h_p = z_p - z_{p-1}$ is the thickness of a pth layer, $\rho_p$ is resistivity of the pth layer, and coth is a hyperbolic cotangent equation.

3. The Wireless Electromagnetic (WEM)-based method according to claim 1, wherein a collecting station for collecting the ground wave propagated from the underground at least one target ore-body to the ground has 12 channels, wherein the collecting station is configured to complete 6 measuring points at a time in a tensor observation manner and 9 measuring points at a time in a scalar measurement,
    wherein the collecting station records and stores full waveform time series,
    wherein the number of sampling bits is 24,
    wherein synchronization of the collecting station is realized by a constant temperature crystal, a GPS, or an atomic clock, the collecting station has a power frequency rejection ratio of greater than 70 dB, a power consumption of 13 W, a weight of 3 kg, a size of 228*200*115 mm,
    wherein the collecting station includes a magnetic sensor, wherein a frequency bandwidth of the magnetic sensor is 0.0625 Hz-10 kHz, a noise level of the magnetic sensor is 1 pT/√Hz @1 Hz, 0.1 pT/√Hz@10 Hz, <0.01 pT/√Hz@>100 Hz, a supply voltage of the magnetic sensor is ±9V to ±15V, an operating temperature of the magnetic sensor is −30° C. to +70° C., the weight of the magnetic sensor is 3 kg, the length of the magnetic sensor is 800 mm, and the diameter of the magnetic sensor is 60 mm.

4. The Wireless Electromagnetic (WEM)-based method according to claim 1, wherein collecting the ground wave propagated from the underground at least one target ore-body to the ground comprises:
    disposing 12 sets of CLEM systems in a measuring line in a due south-north magnetotelluric (MT) manner;
    setting the due north as a positive direction of x-axis, and setting the due east as a positive direction of y-axis, wherein z-axis is oriented vertically downward;
    recording a due south-north electric field as Ex and a due east-west electric field as Ey;
    arranging a magnetic bar by burying the magnetic bar, sealing a junction of the magnetic bar to a wire with a rubber glove; and
    measuring a ground resistance and setting parameters.

5. The Wireless Electromagnetic (WEM)-based method according to claim 1, wherein processing the ground wave propagated from the underground at least one target ore-body to the ground comprises:
    using 3 software for processing, wherein the 3 software includes:

TSSplit software configured to segment an original time series file according to a transmission time of each frequency so that time domain data corresponding to the transmission time of each frequency is saved in one file so as to be free from interference of signals transmitted in other periods when a spectrum analysis is performed;

WEMPro software configured to perform the spectrum analysis of independent time domain data generated by the TSSplit software to obtain electromagnetic spectrum data and Cagniard resistivity and impedance phase data, and then storing the electromagnetic spectrum data and the Cagniard resistivity and impedance phase data in a custom iRES file;

PlotWEMResult drawing software configured to read the iRES file generated by the WEMPro software and automatically output the spectrum of a single frequency, the spectrum of all frequency points, and an electromagnetic field, the Cagniard resistivity, and a phase curve.

* * * * *